United States Patent [19]

McMaster

[11] Patent Number: 4,681,616
[45] Date of Patent: Jul. 21, 1987

[54] GLASS SHEET TEMPERING METHOD AND FURNACE

[75] Inventor: Harold A. McMaster, Woodville, Ohio

[73] Assignee: Glasstech, Inc., Perrysburg, Ohio

[21] Appl. No.: 863,327

[22] Filed: May 15, 1986

Related U.S. Application Data

[60] Division of Ser. No. 754,572, Jul. 15, 1985, Pat. No. 4,620,864, which is a continuation-in-part of Ser. No. 633,637, Jul. 23, 1984, abandoned.

[51] Int. Cl.⁴ .............................................. C03B 27/04
[52] U.S. Cl. ........................................ 65/114; 65/104; 65/119; 65/348; 65/349; 65/351; 432/24; 432/152; 432/189
[58] Field of Search ................. 65/104, 114, 118, 119, 65/348, 349, 351; 432/24, 189, 152

[56] References Cited

U.S. PATENT DOCUMENTS

| | | | |
|---|---|---|---|
| 2,442,242 | 5/1948 | Lewis | 65/104 X |
| 2,842,349 | 7/1958 | Ipsen | 432/152 X |
| 3,298,810 | 1/1967 | McKelvey | 65/107 |
| 4,059,426 | 11/1977 | Starr et al. | 65/349 X |
| 4,397,672 | 8/1983 | Nitschke | 65/114 |
| 4,534,780 | 8/1985 | Cemin | 65/348 |

Primary Examiner—Arthur Kellogg
Attorney, Agent, or Firm—Brooks, & Kushman

[57] ABSTRACT

A glass sheet tempering method and system (10) disclosed utilizes a heating chamber (22) and a quenching chamber (26) which contain ambients at superatmospheric pressure during both the heating and quenching. Forced convection heating is preferably performed in an improved furnace (14"). In one embodiment, heated gas flow is provided by centrifugal blowers which blow air across a plurality of spaced heat tubes. The heated gas flow is directed toward a glass sheet positioned within the heating chamber to provide rapid heating of the glass sheet. In a second embodiment, the heated gas flow is provided by upper and lower sets of opposed gas jet pumps connected to a gas supply. A pressure gas supply including a compressor maintains the superatmospheric pressure of the heating and quenching chambers (22,26). A recirculating gas supply (32) feeds compressed quenching gas to opposed blastheads (28,30) to perform the tempering. An entrance station (12) is also provided for introducing glass sheets into the furnace heating chamber (22), and an exit station (18) is provided for receiving the tempered glass sheets from the quenching chamber (26). Conveyors (34,44) of the furnace and quench units provide conveyance of the glass sheet during the heating and quenching.

13 Claims, 4 Drawing Figures

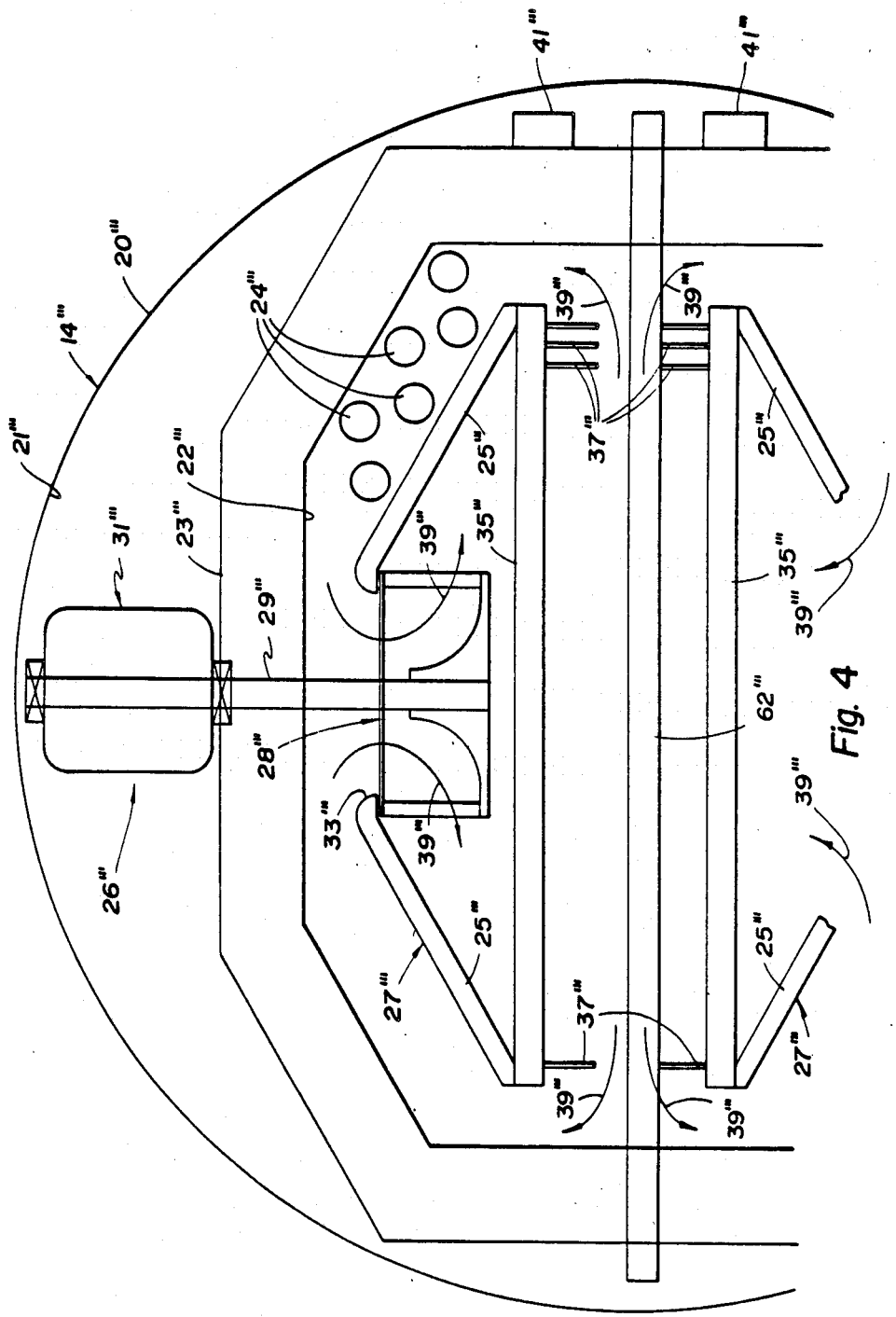

GLASS SHEET TEMPERING METHOD AND FURNACE

CROSS-REFERENCE TO RELATED APPLICATIONS

This application is a division of application U.S. Ser. No. 754,572, filed July 15, 1985, now U.S. Pat. No. 4,620,864 which is a continuation-in-part application of my prior application U.S. Ser. No. 633,637 filed July 23, 1984, now abandoned, the entire disclosure of which is hereby incorporated by reference.

TECHNICAL FIELD

This invention relates to an improved system, apparatus and method for processing and, particularly, tempering glass sheets.

BACKGROUND ART

Glass sheets are conventionally heated to perform bending, tempering, bending and tempering, and pyrolytic filming as well as for other processing. Such heating is conventionally performed in a furnace heating chamber that is heated to a sufficiently high temperature for the particular processing involved and which is maintained at atmospheric pressure. During the heating, the glass sheets can be oriented vertically or horizontally. Tongs are conventionally used in the vertical heating to suspend the glass sheets from their upper edges during conveyance through the heating chamber. Gas support conveyors and roller conveyors are conventionally utilized in the horizontal heating to convey glass sheets through the heating chamber. With the gas support conveyors, gas delivered to the lower surfaces of the glass sheets to provide floating support thereof is supplied from the heating chamber ambient so as to provide heating of the lower surfaces. Both gas support conveyors and roller hearth conveyors have also utilized gas flow directed downwardly against the upper surfaces of the glass sheets to provide heating of the upper surfaces.

The conventional process for tempering glass sheets involves heating a glass sheet within a furnace to a temperature range of about 1100° to 1250° F. and then transferring the heated glass sheet to a quench unit where jets of pressurized quenching gas are impinged against its opposite surfaces. Such quenching rapidly cools the outer surfaces of the glass sheet faster than its center so that upon complete cooling the surfaces are subjected to compressive stresses while the center is tensioned. Due to the compressive stresses at the surfaces, tempered glass sheets are much more resistant to breakage than annealed glass. Also, upon breakage, tempered glass sheets shatter into small relatively dull pieces that are harmless instead of into larger sharp slivers as is the case with annealed glass.

Opposed blastheads such as of the type disclosed by U.S. Pat. No. 3,936,291 are conventionally utilized to supply quenching gas during glass sheet tempering. Such tempering is conventionally performed on flat glass sheets to provide architectural glass, such as in a manner disclosed by U.S. Pat. Nos. 3,806,312, 3,907,132, 3,934,970, 3,947,242, and 3,994,711. In addition, glass sheets are conventionally bent and then tempered between opposed blastheads to provide vehicle glass, such as in the manner disclosed by U.S. Pat. No. 4,282,026.

The U.S. Pat. No. 3,298,810 to Mekelvey, discloses method and apparatus for bending and tempering glass sheets. Nozzles are fed by an air compressor and a gas burner to supply heated gases which supply glass sheets on a curved shaped surface to avoid cross-gauging and to maintain temperature uniformity within the furnace.

Relatively thin glass sheets are much more difficult to temper than thicker ones because the surfaces must be cooled very rapidly in order to set up the thermal gradient between the surfaces and the center. Usually the problem becomes significant when the glass has a thickness of ⅛ inch (i.e. about 3 mm) or less.

The rapid cooling necessary to temper thin glass is conventionally provided by supplying the quenching gas to the opposed blastheads at a much greater pressure than is utilized with thicker glass sheets. Substantial energy is thus required to pressurize the quenching gas in order to temper thin glass, especially at facilities located at high altitudes where the air is much less dense than at lower altitudes. In addition, gas quenching of thin glass is much more noisy than for thicker glass due to the high pressure of the quenching gas used.

The method and apparatus disclosed in the U.S. Pat. No. 4,397,672 to Nitschke is an attempt to overcome the problems associated with tempering of glass sheets especially when thin glass is involved. The quench unit has an enclosed chamber in which gas tempering is performed at superatmospheric pressure. Such a quench unit provides improved tempering as compared to conventional gas tempering due to superior heat transfer that results between the quenching gas and the glass sheet. In addition, tempering of thinner glass sheets is possible and a much quieter operation is involved with the quenching within an enclosed chamber. Furthermore, less breakage occurs when the quenching is performed within an enclosed chamber at superatmospheric pressure.

With the quench unit disclosed in the above-noted Nitschke patent, each heated glass sheet is introduced through an access opening into the enclosed chamber whereupon closing of the opening is followed by pressurization of the chamber to the superatmospheric pressure. During the tempering, energy savings can be achieved if the spent quenching gas within the pressurized quench unit chamber is recirculated rather than being released to the atmosphere. After the tempering is completed, the tempered glass sheet is removed from the quench unit chamber through either the access opening through which it was introduced or through another exit opening. Substantial additional energy savings can also be achieved if the pressurized gas within the quench unit chamber is pumped to a tank before opening of the chamber and then reintroduced back into the chamber from the tank after the chamber is closed for the next cycle. However, a relatively large tank is necessary in order to reuse the pressurized gas within the quench unit and a somewhat complicated fluid handling system is also required to transfer the pressurized gas between the chamber and the tank.

DISCLOSURE OF THE INVENTION

An object of the present invention is to provide an improved system and method for tempering glass sheets by both heating and quenching thereof in chambers at superatmospheric pressure. Such tempering of glass sheets permits introduction of heated glass sheets into the pressurized quenching chamber without having to repressurize the quenching chamber at the beginning of each cycle.

Another object of the present invention is to provide an improved furnace and method for heating glass sheets by utilizing forced convection heating thereof performed in an ambient at superatmospheric pressure. More rapid heating cam be performed by this furnace and method due, in great part, to the greater mass flow rate of gas in an ambient at superatmospheric pressure.

In carrying out the above objects and other objects of the present invention, a glass sheet tempering system constructed in accordance with the invention includes a furnace having an enclosed pressurized heating chamber in which glass sheets are heated to a sufficiently high temperature for tempering in an ambient at a first superatmospheric pressure. A quench unit of the system includes an enclosed pressurized quenching chamber having an ambient at a second superatmospheric pressure and having opposed blastheads for impinging quenching gas on a heated glass sheet received therebetween from the heating chamber so as to temper the glass sheet. Means are provided for communicating the heating and quenching chambers so that the superatmospheric pressures are maintained within their respective chambers during glass sheet transfer therebetween.

Preferably, a pressure gas supply of the system pressurizes the ambients of both the heating and quenching chambers at superatmospheric pressure.

In the preferred construction of the tempering system, the pressure gas supply includes a compressor connected to the rest of the system so as to maintain the superatmospheric pressure of the ambients.

A recirculating gas supply has a connection to the opposed blastheads within the quenching chamber. Gas fed through the opposed blastheads in the quenching chamber tempers the heated glass sheet received therein from the heating chamber.

The preferred construction of the tempering system also includes entrance and exit stations. A low volume air lock of the entrance station feeds glass sheets to be tempered into the pressurized heating chamber for heating in preparation for the quenching. A low volume air lock of the exit station receives the tempered glass sheets from the pressurized quenching chamber after the tempering has been completed. In one embodiment upper and lower sets of compressible rolls are sealingly disposed in at least one of the air locks. The rolls substantially maintain the superatmospheric pressure of the ambients during glass sheet movement both into and out of the air lock.

In a second embodiment at least one of the air locks includes entrance and exit openings having associated doors. Opening and closing of these doors in an alternating manner maintains the superatmospheric pressure of the ambients within the heating and quenching chambers as the glass sheets are fed into and out of the air lock with only a small amount of compressed air being used to repressurize the air lock for each cycle. Alternatively, the pressure in the air locks could be equalized so less new gas need be provided.

As disclosed, the tempering system utilizes roller conveyors having rolls for conveying the glass sheets through the system. A roller conveyor of the furnace receives each glass sheet from the entrance station and provides conveyance thereof during the heating in preparation for the quenching. After the heating, a roller conveyor of the quench unit receives the heated glass sheet from the furnace conveyor and positions the heated glass sheet between the opposed blastheads which occupy upper and lower positions above and below the quench unit conveyor. Both the entrance and exit stations also include rolls within the air lock thereof for feeding the glass sheets into the pressurized heating chamber for heating and for receiving the tempered glass sheets from the pressurized quench unit. In one embodiment all idle spaces around the conveyor components are filled with solid materials to reduce the compressed air volume required to recharge the air space for each cycle.

The improved method for tempering a glass sheet in accordance with the invention is performed by the system by initially heating the glass sheet within an enclosed heating chamber that is pressurized with an ambient at superatmospheric pressure. After the heating, the glass sheet is transferred to an enclosed quenching chamber that is pressurized with an ambient at the same superatmospheric pressure. Quenching of the heated glass sheet within the quenching chamber provides the tempering of the glass sheet to improve its mechanical properties.

The tempering method is performed by initially introducing glass sheets into the heating chamber through an air lock of an entrance station. After completion of the tempering, each tempered glass sheet is fed out of the quenching chamber through an air lock of an exit station.

In performing the tempering method, the glass sheets are preferably conveyed on a roller conveyor through the pressurized heating chamber of the furnace to provide heating thereof to tempering temperature. Thereafter, the heated glass sheet is transferred from the furnace conveyor to a roller conveyor within the pressurized quenching chamber of the quench unit. Quenching gas is supplied through the blastheads to quench and temper the heated glass sheet. Aligned openings of the furnace and the quench unit along the plane of conveyance of the roller conveyors communicate the chambers thereof to permit glass transfer and pressurization of both chambers at the same superatmospheric ambient pressure. A suitable shield or thermal barrier may be supported for movement between open and closed positions with respect to these openings to limit the flow of quenching gas from the quench unit into the heating chamber so as to prevent cooling of the furnace.

In performing the tempering method, the glass sheets are preferably fed onto rolls in the air lock of the entrance station for introduction into the enclosed heating chamber onto the roller conveyor of the furnace. The system can also accommodate glass sheets bent, for example, in the heating chamber on curved rollers, a gas hearth or suitable frames for gravity bending prior to being transferred to the quenching chamber. The tempered bent glass sheets are thereafter transferred from the quenching chamber to an air lock of the exit station capable of receiving the bent glass sheets.

Further in carrying out the above objects and other objects of the present invention, a glass sheet furnace constructed in accordance with the present invention includes an enclosed heating chamber that is pressurized with an ambient at superatmospheric pressure. A forced convection heater of the furnace directs gas flow toward opposite surfaces of a glass sheet within the heating chamber to provide rapid heating of the glass sheet.

In one construction of the furnace the forced convection heater includes at least one blower which blows air across a plurality of spaced heat tubes. The heated gas flow is directed towards a glass sheet positioned within the pressurized heating chamber.

In a second construction of the furnace, the forced convection heater includes opposed gas jet pumps located on opposite sides of a glass sheet within the pressurized heating chamber. Gas jets are supplied by the gas jet pumps to impinge against the opposite surfaces of the glass sheet to provide the rapid heating thereof within the chamber.

As disclosed, the furnace includes a roller conveyor having rolls for conveying glass sheets through the heating chamber in which the conveyed glass sheets are heated by forced convection heating within the ambient at superatmospheric pressure.

In performing the heating method, a glass sheet to be heated is positioned within an enclosed heating chamber having an ambient at superatmospheric pressure. Gas flow is directed against opposite surfaces of the glass sheet to provide the rapid heating of the glass sheet to the required temperature.

In one practice of the method, the heated gas flow proviced by the blower and hot air jets is directed toward the opposite surfaces of the glass sheet to provide the rapid heating thereof within the ambient of the superatmospheric pressure. Since the heated air at superatmospheric pressure is relatively denser than heated at atmospheric pressure, centrifugal blowers are preferably used.

The objects, features and advantages of the present invention are readily apparent from the following detailed description of the best modes for practicing the invention when taken in connection with the accompanying drawings.

BRIEF DESCRIPTION OF THE DRAWINGS

FIG. 4 is a sectional view transverse the view of FIG. 3 and illustrating a second furnace constructed in accordance with the invention to perform the method thereof.

BEST MODES FOR CARRYING OUT THE INVENTION

Figure 1:
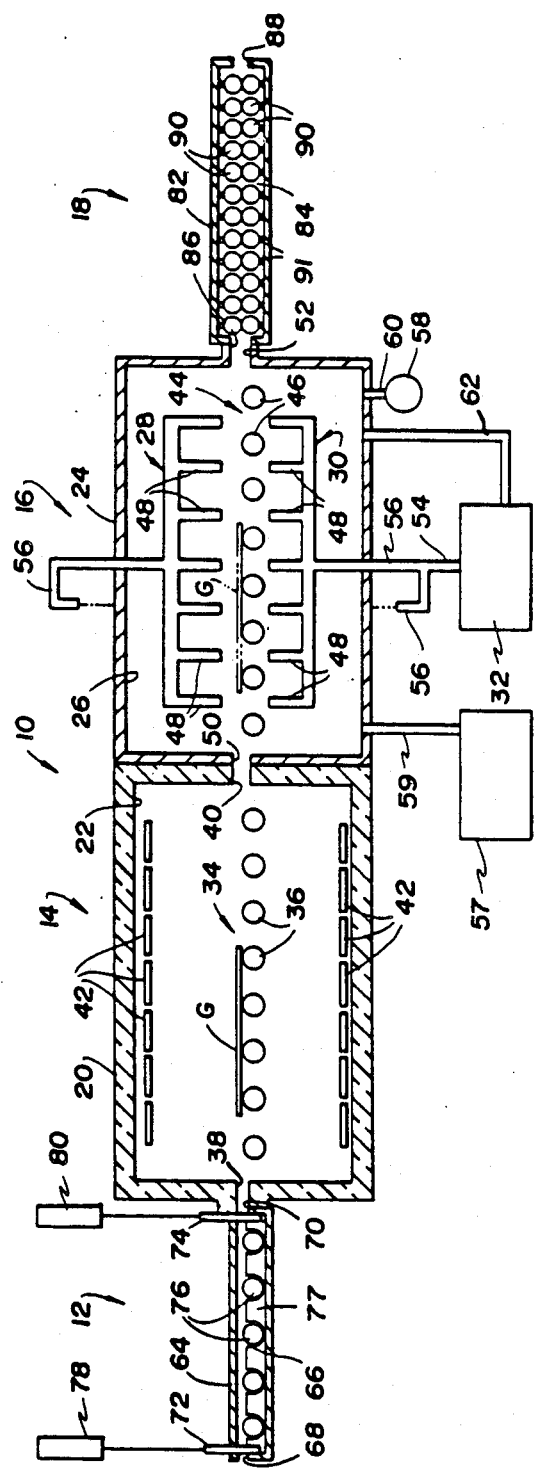
FIG. 1 is a schematic longitudinal sectional view taken through a tempering system with a first embodiment of a quench unit that is constructed in accordance with the invention to provide the improved tempering method.

With reference to FIG. 1 of the drawings, a glass sheet tempering system constructed in accordance with the present invention and operable to perform the tempering method thereof is generally indicated by reference numeral 10. This tempering system will be described with the understanding that the description is also applicable to the method of tempering performed by the system.

The tempering system 10 includes an entrance station 12, a furnace 14, a quench unit 16, and an exit station 18. As is hereinafter more fully described, entrance station 12 introduces glass sheets G into the furnace 14 for heating prior to transfer thereof to the quench unit 14 for tempering. The exit station 18 receives the tempered glass sheets from the quench unit 16 after the tempering process is completed.

Figure 2:
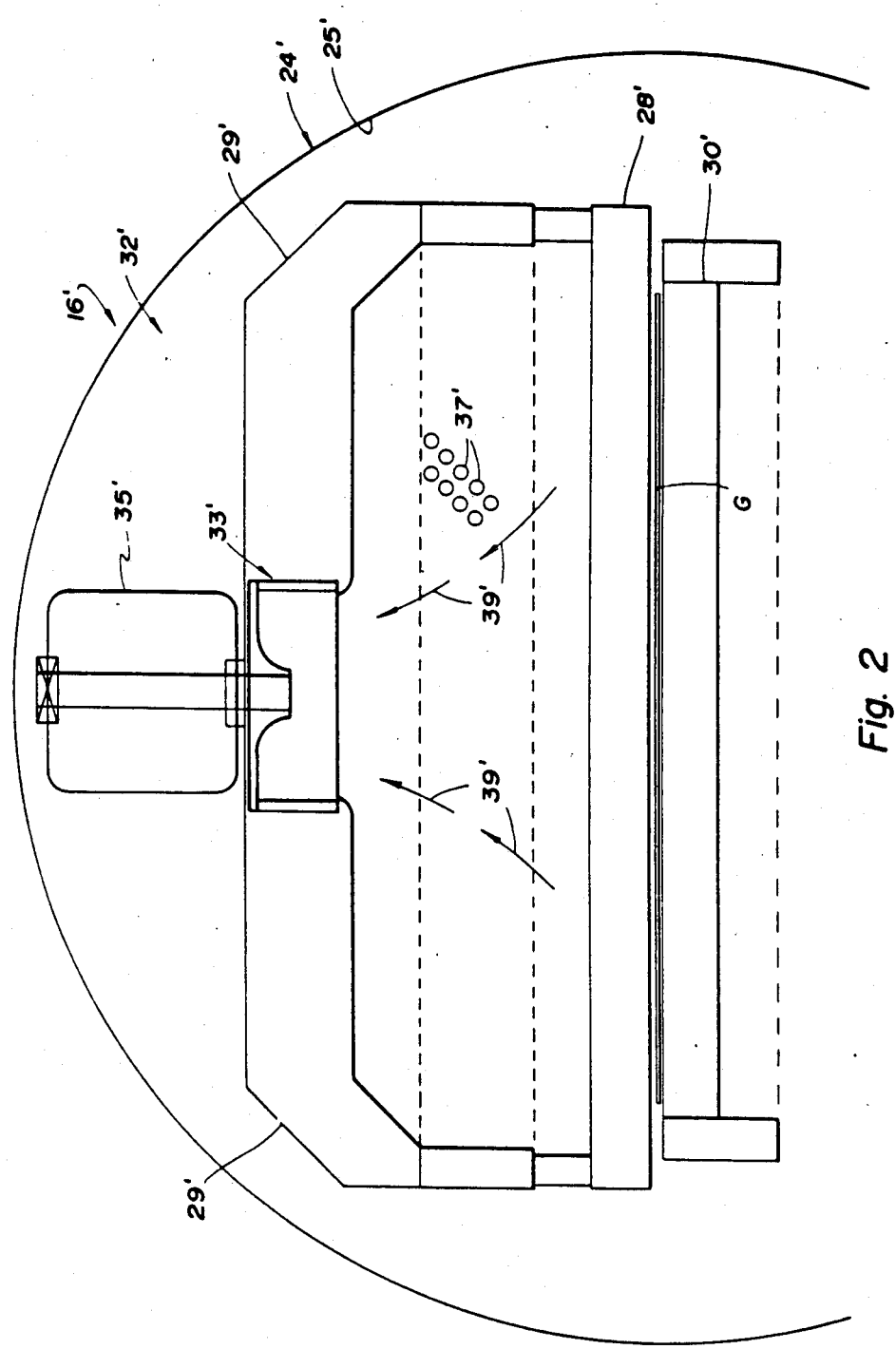
FIG. 2 is a sectional view of a second embodiment of a quench unit for use in the tempering system.

With reference to FIG. 2 of the drawings, a quench unit 16' illustrates a second construction to perform the method of quenching the glass sheets and may be utilized in place of the quench unit 16 in the system 10.

The furnace 14 of the tempering system includes an insulated housing 20 defining an enclosed heating chamber 22 in which glass sheets are heated to a sufficiently high temperature for tempering. In the embodiment of FIG. 1, the quench unit 16 includes a housing 24 defining an enclosed quenching chamber 26 in which the heated glass sheets are quenched. A recirculating gas supply 32 feeds compressed quenching gas to the opposed blastheads 28 and 30. The opposed blastheads 28 and 30 supply the quenching gas to a heated glass sheet received therebetween from the heating chamber 22 in order to rapidly cool the glass sheet and perform the tempering. A pressure gas supply 57 of the tempering system pressurized both the heating and quenching chambers with ambients at superatmospheric pressure as is hereinafter more fully described.

Performing the heating of the glass sheet within the pressurized furnace chamber 22 permits each heated glass sheet to be transferred into the pressurized quenching chamber 26 which can be continuously maintained at the superatmospheric pressure throughout the operation of the system. There is no need for a costly pressure door between the furnace and quenching chambers 22 and 26, respectively. Consequently, there is no need to repressurize the system each time a glass sheet is transferred from the furnace chamber 22 to the quenching chamber 26. Also, there is no need for costly control equipment to synchronize the opening and closing of such a door with glass sheet movement between the two chambers 22 and 26.

Maintaining the pressurized quenching chamber 26 at the superatmospheric pressure throughout the operation decreases the energy input necessary to perform the tempering as compared to the energy involved with pressurizing the quenching chamber upon introduction of each glass sheet thereinto and depressurizing the chamber for exiting of the glass sheet therefrom for delivery.

The furnace 14 includes a roller conveyor 34 having rolls 36 on which the glass sheets G are conveyed during the heating. An entrance opening 38 of the furnace housing 20 is aligned with the upper sides of the conveyor rolls 36 to allow introduction of each glass sheet G into the heating chamber 22 from the entrance station 12. Likewise, an exit opening 40 of the furnace housing 20 is also aligned with the upper sides of the conveyor rolls 36 to allow transferring of the heated glass sheets from the heating chamber 22 to the quenching chamber 26. Any suitable type of heating can be utilized with the furnace 14 to provide heating of the glass sheets on the furnace roller conveyor 34. As illustrated, electric resistance elements 42 above and below the roller conveyor 34 provide the heating. However, it is also possible to use gas heaters or any other suitable type of heater to perform the glass sheet heating.

In the embodiment of FIG. 1, the quench unit 16 includes a roller conveyor 44 having rolls 46 on which each glass sheet G is supported during the quenching operation. The blastheads 28 and 30 respectively occupy upper and lower positions above and below the roller conveyor 44. Banks of spaced nozzles 48 of each blasthead deliver quenching gas that quenches and thereby tempers the glass sheet conveyed on the quench unit conveyor 44. It will be noted that the lower nozzle banks 48 are located between the conveyor rolls 46 such that upwardly directed quenching gas therefrom is supplied between the rolls for impingement with the lower surface of the conveyed glass sheet. Upper nozzle banks 48 are aligned with the lower nozzle banks to provide aligned impingement of the quenching gas that counterbalances the forces applied to the glass sheet G on the quench unit roller conveyor 44.

The upper sides of the rolls 46 of the quench unit roller conveyor 44 are aligned with an entrance opening 50 of the quench unit housing 24. This entrance opening 50 of the quench unit is aligned with the exit opening 40 of the furnace to permit transfer of the heated glass sheets from the furnace to the quench unit for tempering. Openings 40 and 50 also communicate the furnace heating chamber 22 and the quenching chamber 26 such that pressurization of one chamber also pressurizes the other chamber. It should also be noted that a movable thermal barrier or shield can be utilized in the quenching chamber 26 adjacent its entrance opening 50 to prevent the quenching gas that impinges with the glass sheet from flowing back into the furnace and cooling the next glass sheet being heated. After the quenching is completed, the tempered glass sheet is conveyed by the rolls 46 of the quench unit roller conveyor 44 out through an exit opening 52 of housing 24 to the exit station 18.

It should be noted that any type of suitable drive mechanism can be utilized to rotatively drive the furnace and quench unit roller conveyors 34 and 44. In the furnace, the conveyor can be driven in opposite directions to provide oscillation of the glass sheet during the heating so that the furnace conveyor length can be decreased. Alternatively, the furnace conveyor can have a longer length such that the glass sheets are conveyed continuously in the forward direction toward the right to the quench unit. Within the quench unit, the glass sheet is preferably continuously moved on the roller conveyor 44 either in the forward direction toward the right or in an oscillating manner back and forth.

It should also be noted that the system 10 can be modified to temper glass bent, for example, in the heating chamber 22 on bent rollers, a gas hearth or suitable frames for gravity bending prior to being transferred to the quenching chamber 26.

The recirculating gas supply 32 of the tempering system has an outlet 54 that feeds recirculated, compressed quenching gas through tubular connections 56 to the upper and lower blastheads 28 and 30. The quenching gas supplied through the banks of nozzles 48 of the blastheads tempers the glass sheet. The spent quenching gas is fed by a conduit 62 back to the gas supply 32 where cooling and further pressurization thereof takes place prior to being fed back to the blastheads in a recirculating manner.

The pressure gas supply 57 is connected by a conduit 59 to the quenching chamber 26 to maintain the superatmospheric pressure of the ambient within the quenching chamber 26 and through the openings 40 and 50 also pressurizes the ambient in the heating chamber 22. A pressure relief valve 58 is connected by a conduit 60 to the quenching chamber 26 so as to maintain the pressure of the superatmospheric ambient below a predetermined level.

The quench unit 16' of the second embodiment includes a cylindrical housing 24'. The housing 24' defines an enclosed pressurized quenching chamber 25' in which the heated glass sheets are quenched. The chamber 25' is pressurized with an ambient at superatmospheric pressure as is hereinafter more fully described.

The quench unit 16' also includes a recirculating gas supply 32' which is located within the quenching chamber 25'. The gas supply 32' feeds quenching gas to opposed air jet headers 28' and 30' through upper and lower plenums 29' (only the upper plenums are shows for simplicity). The headers 28' and 30' supply the quenching gas to the heated glass sheet received therebetween from the heating chamber 22 in order to rapidly cool the glass sheet and perform the tempering.

While not shown in FIG. 2, the pressure gas supply 57 of the tempering system pressurizes the heating and quenching chambers 22 and 25', respectively with ambients at superatmospheric pressure as in the first embodiment.

The quench unit 16' preferably includes a roller conveyor (not shown but substantially the same as the roller conveyor 44) having rolls on which each glass sheet is supported during the quenching operation. The headers 28' and 30' respectively occupy upper and lower positions above and below the roller conveyor. Banks of spaced nozzles of each header deliver quenching gas that quenches and thereby tempers the glass sheet. The lower nozzle banks are located between the conveyor rolls such that upwardly directed quenching gas therefrom is supplied between the rolls for impingement with the lower surface of the conveyed glass sheet. Upper nozzle banks are aligned with the lower nozzle banks to provide aligned impingement of the quenching gas that counterbalances the forces applied to the glass sheet G.

The recirculating gas supply 32' of the tempering system includes upper and lower centrifugal blowers, only the upper one of which is generally indicated at 33'. The axle of each of the blowers 33' is fixedly mounted on the rotatable shaft of an AC motor 35'. The motors 35' are mounted on the plenums 29' so that the blowers 33' are disposed in the plenums 29' to feed quenching gas thereinto.

Sets of cooling coils 37' (only a few of the top set are shown for simplicity) are disposed between the air intake opening of the blowers 33' and their associated headers to cool air flowing to the blowers 33' after impingement with the glass sheet. The cooling coils 37' extend along the longitudinal length of the headers 28' and 30' and are supported by the plenums 29'. The cooling coils 37' are filled with water to remove heat from the spent quenching gas. The cooling water can be dumped or recycled through an external heat exchanger (not shown).

Upon energization of the A.C. motors 35', the blowers 33' recirculate the low pressure air in the direction of arrows 39' across the cooling coils 37', into the plenums 29' and through the nozzles of the headers 28' and 30' in a recirculating manner.

The pressure relief valve 58 can be set at any pressure so long as the pressure within the quenching chamber is above atmospheric pressure to provide the benefits that are derived from quenching with an ambient at superatmospheric pressure. However, it is preferable for the ambient pressure within the quenching chamber to be at least 10 pounds per square inch above atmospheric pressure in order to provide sufficient increased cooling to economically justify the cost involved with this enclosed type of tempering system as compared to conventional tempering systems. Likewise, the pressure should be no more than 100 pounds per square inch above atmospheric pressure since the cost involved in designing the furnace and quench unit housings 20, 24 and 24' to withstand any greater pressure would not appear to be warranted. Testing to date has shown that a pressure of 60 pounds per square inch above atmospheric pressure provides good results.

The entrance station 12 of the tempering system 10 includes a housing 64 that defines an air lock chamber 66 upstream from the furnace entrance opening 38. The housing 64 includes an entrance opening 68 at its left side and an exit opening 70 at its right side adjacent to and aligned with the entrance opening 38 of the furnace. Entrance and exit doors 72 and 74 open and close the openings 68 and 70 of the air lock chamber 66. Rolls 76 of a roller conveyor receive a glass sheet introduced into the air lock chamber 66 through its entrance opening 68 and introduce the glass sheet through the exit opening 70 into the furnace heating chamber 22 through its entrance opening 38. All free spaces around the conveyor components are filled with solid materials 77 to reduce the compressed air volume to recharge the air lock chamber 66 for each cycle. Entrance and exit door actuators 78 and 80 operate the entrance and exit doors 72 and 74 such that only one door is open at any given time.

During introduction of a glass sheet into the air lock chamber 66 of the entrance station, the entrance door 72 is opened while the exit door 74 is closed. Subsequently, the entrance door 72 is closed and the exit door 74 is thereafter opened to introduce the glass sheet into the furnace heating chamber 22 for the heating and subsequent tempering. Such opening and closing of the entrance and exit doors 72 and 74 permits introduction of glass sheets into the furnace for heating while maintaining the superatmospheric pressure of the furnace and quench unit ambients. Use of an air lock chamber with a minimum air volume assures that very little compressed air is lost during each opening and closing cycle.

The exit station 18 includes a housing 82 defining an air lock chamber 84 through which the tempered glass sheets are fed out of the tempering system. An entrance opening 86 of the housing 82 is located at its left side adjacent the exit opening 52 of the quench unit so as to permit feeding of tempered glass sheets into the air lock chamber 84. An exit opening 88 defined by the housing 82 permits the tempered glass sheets to be fed out of the tempering system. Rolls of a roller conveyor similar to the ones of the entrance station 12 may be used, especially if the glass sheets are bent. Alternatively, compressible rolls 90 within the exit air lock chamber 84 are provided in upper and lower sets so as to provide conveyance of glass sheets therebetween the exit station 18. Entrance and exit doors are not required to respectively open and close the entrance and exit openings 86 and 88 of the exit air lock chamber 84 to permit the tempered glass sheets to be fed out of the system. Rather, each roll 90 carries a seal 100 for sealing against the top and bottom inner walls of the housing 82 to assure that very little compressed air is lost when the glass sheet moves out of the exit opening 88.

Also, alternatively, compressible rolls similar to the ones of the exit station 18 may be used at the entrance station 12 to eliminate the need for entrance and exit actuators and their associated doors.

Figure 3:
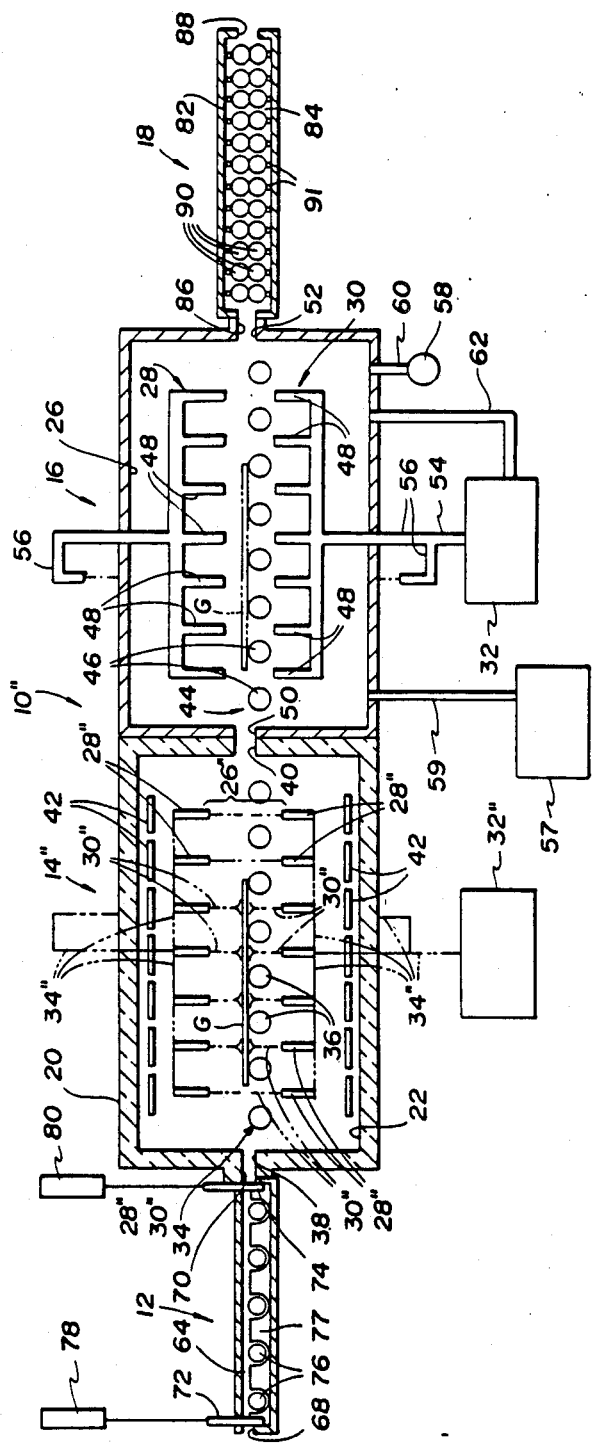
FIG. 3 is a longitudinal sectional view taken through a glass sheet tempering system including an improved heating furnace constructed in accordance with the invention to perform the method thereof for heating glass sheets.

With reference to FIG. 3 of the drawings, a glass sheet tempering system generally indicated by 10" includes an entrance station 12, a furnace 14", a processing station embodied by a quench unit 16, and an exit station 18. The furnace 14" is constructed in accordance with the invention to perform the method of heating glass sheets thereof and will be described with the understanding that this description is also applicable to the heating method performed by the furnace.

With reference to FIG. 4 of the drawings, a furnace 14''' illustrates a second construction to perform the method of heating glass sheets and may be utilized in place of the furnace 14" in the system 10".

As was more fully described heretofore, the entrance station 12 of the tempering system introduces glass sheets G into the furnace 14" for heating prior to transfer thereof to the quench unit 16 for tempering. The exit station 18 receives the tempered glass sheets G from the quench unit 16 after the tempering process is completed.

The furnace 14" of the tempering system includes the insulated housing 20 that defines the enclosed heating chamber 22. As previously described, the furnace heating chamber 22 is pressurized with an ambient at superatmospheric pressure. Any suitable type of heating can be utilized to provide heating of the pressurized ambient within the heating chamber 22 such as, for example, the electric resistance elements 42.

A forced convection heater collectively indicated by 26" is located within the heating chamber 22 and directs gas flow toward the glass sheet G within the heating chamber 22 to provide rapid heating of the glass sheet. Such rapid heating is achieved by virtue of the superatmospheric pressure within the heating chamber 22 and the fact that the forced convection heating provides a greater mass flow rate of heated gas as compared to heating performed at atmospheric pressure (i.e. the increased mass flow rate contributes to the increased heat transfer rate).

In the embodiment shown in FIG. 3, the forced convection heater 26" includes opposed gas jet pumps 28" arranged in upper and lower sets. These gas jet pumps 28" supply gas jets 30" that provide gas flow against the opposite surfaces of the glass sheet during the heating thereof within the heating chamber 22. A suitable external gas supply 32" is connected by conduits 34" to the gas jet pumps 28". Compressed gas fed from the supply 32" through the conduits 34" to the gas jet pumps 28" thus provides the gas jets 30" which constitute a primary gas flow that induces a secondary gas flow of the pressurized ambient. The combined primary and secondary gas flow is directed toward the glass sheet G to provide the rapid glass sheet heating.

Gas jet pumps 28" may merely comprise single jet openings but preferably are of the injector type which provide a much higher ratio of secondary gas flow to the primary gas flow and thus result in greater heating than with simple jet openings. Also, the pressurized gas supply to the gas jet pumps 28" may be heated prior to delivery and thereby provide the sole or primary source of heat for the furnace. In such case, no electric resistance heating elements 42 or other substantial heating in addition to the heater 26" is necessary.

The furnace 14''' of the second embodiment includes a cylindrical housing 20''', similar to the cylindrical housing of the quench unit 16'. The housing 20''' defines an enclosed pressure chamber 21''' that is pressurized with an ambient at superatmospheric pressure as is hereinafter more fully described.

The furnace 14''' also includes a layer 23''' of blanket insulation that defines a furnace heating chamber 22''' within the pressure chamber 21'''. Any suitable type of heating can be utilized to provide heating of the pressurized ambient within the heating chamber 22''' such as, for example, the electric resistance elements of FIG. 3. However, it is preferable to heat the pressurized ambient by upper and lower sets of heat tubes 24''' (only the upper set is shown for simplicity) which extend along the longitudinal length of the furnace 14''' and through an end wall of the furnace 14'''. The heat tubes 24''' are disposed between the insulating layer 23''' and outer walls 25''' of upper and lower, hollow fused silica structures 27'''.

The heat tubes 24''' may comprise metal vapor "heat pipes" which are heated by gas burners to assure uniform heating within the furnace 14'''. The furnace may be an oscillating furnace or, alternately, a continuous furnace wherein the heat tubes 24''' are directly gas-fired. The average heating effort would be the same for all areas of successive pieces of glass despite the resulting temperature variation along the lengths of the heat tubes 24'''.

A forced convection heater, generally indicated at 26''' is located within the pressure chamber 21''' and directs gas flow toward a glass sheet disposed within the heating chamber 22''' to provide rapid heating of the glass sheet. Such rapid heating is again achieved by virtue of the superatmospheric pressure within the heating chamber 22''' and the fact that the forced convection heating provides a greater mass flow of heated gas is compared to heating performed at atmospheric pressure. The greater mass flow rate contributes to the increased heat transfer rate.

The convection heater 26''' includes upper and lower centrifugal blowers, only the upper one of which is shown and is generally indicated at 28'''. The axle of each of the blowers is fixedly mounted on the rotatable shaft 29''' of an AC motor, generally indicated at 31'''. Each motor 31''', in turn, is mounted on the layer 23''' of insulation outside of the heating chamber 22''' but inside the pressure chamber 21'''. The shaft 27''' of the motor 31''' extends through the layer 23''' of insulation and into the blower 28'''. Each of the blowers 28''' is mounted in its respective fused silica structure 27''' immediately adjacent an opening 33''' formed by its outer walls 25'''.

Each of the structures 27''' also includes an inner wall 35''' of fused silica from which a set of nozzles 37''' extends towards a glass sheet positioned between the sets of nozzles 37'''. The nozzles 37''' are in fluid communication with the inner cavities defined by their respective hollow structures 27'''. The nozzles 37''' direct the gas flow to impinge against the opposite surfaces of the glass sheet during the heating thereof within the heating chamber 22'''. Upon energization of the AC motors 31''' their respective blowers 28''' circulate air in the direction of arrows 39''' across the heat tubes 24''', into the cavities of the structures 27''' and through the nozzles 37'''. The gas jets further induce a secondary gas flow of the pressurized ambient. The combined primary and secondary gas flow is directed toward the glass sheet to provide the rapid glass sheet heating.

Also positioned between the layer 23''' of insulation and the housing 20''' are cooling water ducts 41' for circulating cooling water about the heating chamber 22'''. The cooling water alternately can be dumped or recycled through an external heat exchanger (not shown).

Since glass can be heated at least twice as fast by forced convection than by radiation alone, the furnaces 14'' and 14''' can be correspondingly shortened to offset the cost of the pressure supply system. One of the most important advantages is that the glass sheets can be more uniformly heated than can be done by radiation alone.

The previous detailed description of the furnace 14 is equally applicable to the furnaces 14'' and 14''' except where previously indicated to the contrary.

While the best modes for carrying out the invention has been described in detail, those familiar with the art to which this invention relates will recognize various alternative ways of practicing the invention as defined by the following claims.

What is claimed is:

1. A glass sheet furnace for use in a glass sheet processing system, said furnace comprising: an enclosed heating chamber that is pressurized with an ambient at superatmospheric pressure; a forced convection heater for directing heated gas flow towards opposite surfaces of a glass sheet within the heating chamber to provide rapid heating of the glass sheet; an entrance station in communication with the heating chamber for introducing a glass sheet to be heated into the heating chamber; and means for maintaining the superatmospheric pressure within the heating chamber during glass sheet transfer between the heating chamber and the entrance station.

2. A furnace as in claim 1 wherein the forced convection heater includes gas jets and at least one blower for supplying gas flow thereto, the gas jets directing heated air against the opposite surfaces of the glass sheet during the heating thereof within the chamber.

3. A furnace as in claim 1 wherein the forced convection heater includes opposed gas jet pumps for providing the gas flow directed against the opposite surfaces of the glass sheet during the heating thereof within the chamber.

4. A furnace as in claim 1 or 2 or 15 further including a processing station having an enclosed chamber in which the heated glass sheet is processed while within an ambient at superatmospheric pressure.

5. A furnace as in claim 1 wherein the entrance station has an air lock through which each glass sheet is introduced into the furnace, and further including an exit station having an air lock through which each glass sheet exits.

6. A glass sheet furnace for use in a glass sheet processing system, said furnace comprising: an enclosed heating chamber that is pressurized with an ambient at superatmospheric pressure; a roller conveyor having rolls for conveying glass sheets through the heating chamber; a forced convection heater for directing gas flow against the opposite surfaces of a glass sheet on the conveyor to provide rapid heating of the glass sheet; an entrance station in communication with the heating chamber for introducing a glass sheet to be heated into the heating chamber; and means for maintaining the superatmospheric pressure within the heating chamber during glass sheet transfer between the heating chamber and the entrance station.

7. A glass sheet furnace for use in a glass sheet processing system, said furnace comprising: an enclosed heating chamber that is pressurized with an ambient at superatmospheric pressure; a roller conveyor having rolls for conveying glass sheets through the heating chamber; a forced convection heater for directing gas flow against the opposite surfaces of a glass sheet on the conveyor to provide rapid heating of the glass sheet; a processing station having an enclosed chamber in which the heated glass sheet is processed within an ambient at superatmospheric pressure; an exit station through which the glass sheet is fed out of the processing station; an entrance station in communication with the heating chamber for introducing a glass sheet to be heated into the heating chamber; and means for maintaining the superatmospheric pressure within the heating chamber during glass sheet transfer between the heating chamber and the entrance station.

8. A method for heating a glass sheet comprising: positioning a glass sheet within an enclosed heating chamber having an ambient at superatmospheric pressure; directing heated gas flow to impinge against opposite surfaces of the glass sheet to provide rapid heating of the glass sheet, transferring a glass sheet to be heated from an entrance station to the heating chamber and maintaining the superatmospheric pressure in the heating chamber during the step of transferring.

9. A method as in claim 8 wherein the gas flow is supplied by gas jet pumps that provide gas flow directed toward the opposite surfaces of the glass sheet.

10. A method as in claim 8 wherein the gas flow is supplied by at least one blower and a plurality of gas jets that provide the heated gas flow directed toward the opposite surfaces of the glass sheet.

11. A method as in claim 8, or 9 or 26 wherein the heated glass sheet is processed within an enclosed chamber having an ambient at superatmospheric pressure.

12. A method for heating and processing a glass sheet comprising: conveying a glass sheet on a roller conveyor within an enclosed heating chamber that is pressurized with an ambient at superatmospheric pressure; directing gas flow toward opposite surfaces of the glass sheet on the roller conveyor to provide rapid heating thereof; processing the heated glass sheet within an enclosed processing chamber having an ambient at superatmospheric pressure, transferring a glass sheet to be heated from an entrance station to the heating chamber and maintaining the superatmospheric pressure in the heating chamber during the step of transferring.

13. A method as in claim 12 wherein the entrance station has an air lock and wherein the processed glass sheet is fed out of the processing chamber through an exit station having an air lock.

* * * * *